US011312837B2

(12) United States Patent
Bullock et al.

(10) Patent No.: US 11,312,837 B2
(45) Date of Patent: Apr. 26, 2022

(54) SYSTEMS AND METHODS FOR RECYCLING POST-CONSUMER POLYESTER-BASED FABRIC

(71) Applicant: Science Medical, LLC, Saratoga Springs, UT (US)

(72) Inventors: Jeff Bullock, Saratoga Springs, UT (US); German Jimenez, Mercedes Norte (CR)

( * ) Notice: Subject to any disclaimer, the term of this patent is extended or adjusted under 35 U.S.C. 154(b) by 0 days.

(21) Appl. No.: 16/347,513

(22) PCT Filed: Nov. 3, 2017

(86) PCT No.: PCT/US2017/060017
§ 371 (c)(1),
(2) Date: May 3, 2019

(87) PCT Pub. No.: WO2018/085704
PCT Pub. Date: May 11, 2018

(65) Prior Publication Data
US 2019/0276631 A1    Sep. 12, 2019

Related U.S. Application Data

(60) Provisional application No. 62/417,071, filed on Nov. 3, 2016.

(51) Int. Cl.
| *C08J 11/12* | (2006.01) |
| *C08J 11/08* | (2006.01) |
| *B09B 3/00*  | (2022.01) |

(52) U.S. Cl.
CPC ............... *C08J 11/08* (2013.01); *B09B 3/00* (2013.01); *B09B 3/0075* (2013.01); *C08J 2367/00* (2013.01); *Y02P 20/143* (2015.11); *Y02W 30/62* (2015.05)

(58) Field of Classification Search
USPC ......................................................... 521/40
See application file for complete search history.

(56) References Cited

U.S. PATENT DOCUMENTS

| 5,876,644 A     | 3/1999 | Nichols et al. |
| 5,886,058 A     | 3/1999 | Van Erden et al. |
| 2011/0071230 A1 | 3/2011 | Ji |
| 2013/0053462 A1* | 2/2013 | Bhatt ............... C08J 11/14 521/48.5 |

FOREIGN PATENT DOCUMENTS

JP    4014356    11/2007

* cited by examiner

*Primary Examiner* — Terressa Boykin
(74) *Attorney, Agent, or Firm* — David R. Conklin; Kirton McConkie

(57) ABSTRACT

Methods for recycling post-consume polyester-based fabric materials such as hospital linens. The methods include decontaminating a post-consumer polyethylene terephthalate (PET) product and polymerizing the decontaminated PET product via solid state polymerization to generate a polymerized PET product. The post-consumer PET product may include a polyester-based fabric. The post-consumer PET product may retain essentially the same shape and form during and after recycling and decontamination as before recycling.

20 Claims, 2 Drawing Sheets

SYSTEMS AND METHODS FOR RECYCLING POST-CONSUMER POLYESTER-BASED FABRIC

This application is a US National Phase application based on PCT Application No. PCT/US17/60017, filed Nov. 3, 2017, which claims priority to U.S. Provisional Patent Application Ser. No. 62/417,071, entitled SYSTEM AND METHODS FOR RECYCLING POST-CONSUMER POLYESTER-BASED FABRIC, filed on Nov. 3, 2016, each of which is incorporated herein by reference in its entirety.

BACKGROUND

The present disclosure generally relates to systems and methods for recycling post-consumer polyester-based fabrics. More particularly, some implementations of the present disclosure relate to systems and methods for recycling soiled hospital bedding comprising polyester-based fabrics.

A number of service industries such as hospitals, medical clinics, hotels and other hospitality providers, gyms, health clubs, and similar service providers generate large amounts of soiled clothing, linens, bedding, towels, and other fabric-based items. It can be challenging to properly clean and/or decontaminate these fabric-based items. It can also be time-consuming, costly, labor-intensive, and harmful to the environment. In particular, properly cleaning and decontaminating soiled hospital linens can be especially problematic. For example, each year in the United States, hospitals generate an estimated six billion pounds of soiled hospital linens. These soiled hospital linens can constitute a large source of infectious contamination that must be properly cleaned and decontaminated before being returned to service to prevent cross-contamination throughout the hospital facility.

Conventional methods of cleaning and decontaminating soiled hospital linens involve labor-intensive laundering of the soiled hospital linens. This laundering of the soiled hospital linens may require tens to hundreds of millions of gallons of water in a single year by a single facility. Additionally, strict protocols for collecting, transporting, processing, and storing clean and soiled hospital linens must be followed to limit infection of patients, staff, and medical practitioners. In some cases, single-use or limited-use hospital linens comprising polyester-based fabrics can reduce the need to launder soiled hospital linens. While these single-use or limited-use polyester-based linens can be discarded after use, it can be harmful to the environment to discard these items after use. Furthermore, conventional methods are limited in their ability to recycle these soiled single-use or limited-use polyester-based linens.

Thus, while conventional methods of cleaning and decontaminating soiled hospital linens currently exist, challenges still exist, including those listed above. Accordingly, it would be an improvement in the art to augment or even replace current techniques with other techniques.

BRIEF SUMMARY

The present disclosure generally relates to systems and methods for recycling post-consumer polyester-based fabrics. The methods can comprise decontaminating a post-consumer polyethylene terephthalate (PET) product to remove one or more of infectious waste, tissue, and colorants and polymerizing the decontaminated PET product via solid state polymerization to generate a polymerized PET product. The post-consumer PET product can comprise post-consumer PET product that is substantially unaltered from its pre-consumer form. The post-consumer PET product can comprise a PET-based woven or non-woven fabric. The PET-based woven or non-woven fabric can comprise a thickness of no more than 1 mm. The PET-based woven or non-woven fabric can comprise soiled hospital bedding.

In some cases, decontaminating can comprise incubating the post-consumer PET product in a stirred vessel with solvent. Decontaminating can comprise incubating at between about 50° C. and about 200° C. Decontaminating can comprise incubating at between about 90 kPa and about 200 kPa. Decontaminating can also comprise incubating for between about 15 minutes and about 100 minutes. In other cases, the solvent can comprise one or more of ethanol, benzene, ethylene glycol, propylene glycol, water, and acetone. In yet other cases, the solvent can be continuously filtered. The filtering can include filtering with a membrane-type filter, filtering with a screen filter, filtering with active carbon, and filtering with a belt-filter. Decontamination can also include removing the solvent after incubation and drying the decontaminated PET product.

In some instances, solid state polymerization can comprise heating the decontaminated PET product to a temperature of between about 190° C. and about 230° C. In other instances, heating is carried out under a vacuum. In yet other instances, heating is carried out in an inert gas atmosphere. The inert gas atmosphere can comprise one or more of nitrogen, helium, and argon. The solid state polymerization can be carried out for between about 8 hours and about 48 hours.

In some embodiments, the method further comprises converting the polymerized PET product into pellets. In other embodiments, the pellets are no more than about 1 mm in diameter. In yet other embodiments, the methods include extruding the polymerized PET product into a synthetic fiber. In some cases, the method includes extruding the polymerized PET product into sheets. In other cases, decontaminating further comprises removing one or more of human waste, biomedical waste, tissue, skin, hair, blood, urine, feces, bodily fluids, clinical waste, medical waste, inks, dyes, and dirt. In yet other cases, the method includes shredding the post-consumer PET product to a size range of between about 2 cm and about 5 cm. The method can further comprise removing any elastic material from the shredded post-consumer polyethylene terephthalate (PET) materials.

BRIEF DESCRIPTION OF SEVERAL VIEWS OF THE DRAWINGS

In order that the above-recited and other features and advantages of the disclosure are obtained and will be readily understood, a more particular description of the disclosure briefly described above will be rendered by reference to specific embodiments thereof, which are illustrated in the appended drawings. These drawings depict only typical embodiments of the disclosure and are not therefore to be considered to limit the scope of the disclosure.

DETAILED DESCRIPTION

The presently preferred embodiments of the present disclosure will be best understood by reference to the drawings, wherein like reference numbers indicate identical or functionally similar elements. It will be readily understood that the components of the present disclosure, as generally described and illustrated in the figures herein, could be arranged and designed in a wide variety of different configurations. Thus, the following more detailed description, as represented in the figures, is not intended to limit the scope of the disclosure as claimed, but is merely representative of presently preferred embodiments of the disclosure.

The present disclosure relates to systems and methods for recycling post-consumer polyester-based fabrics. More particularly, some embodiments of the present disclosure relate to systems and methods for recycling soiled hospital linens comprising polyester-based fabrics. While the systems and methods can comprise any suitable step and/or component, in some cases, they include providing post-consumer PET product, decontaminating the post-consumer PET product, polymerizing the decontaminated PET product, and forming products from the polymerized PET product. Additionally, in some embodiments, the systems and methods include polymerizing the decontaminated PET product via solid state polymerization.

Figure 1:
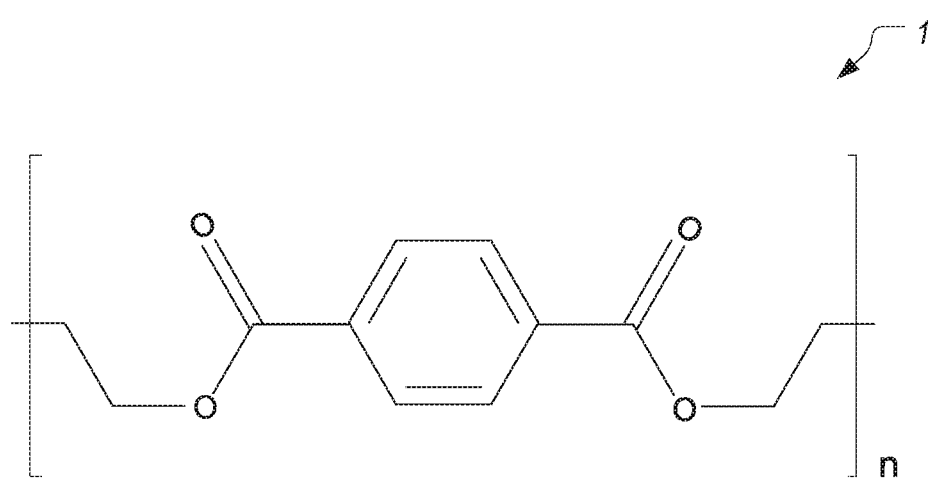
FIG. 1 illustrates some embodiments of a PET molecule.

In the disclosure and the claims, the term PET (and variations thereof such as PETE) can be used to refer to a thermoplastic polymer resin of the polyester family comprising the chemical formula (C10H8O4)n. FIG. 1 illustrates a chemical structure of a PET molecule 1. PET can also be known as polyethylene terephthalate or poly(ethyl benzene-1,4-dicarboxylate). In some cases, PET can comprise other condensation polymers made by melt polymerization (e.g., PET, PBT, PEN, PEN/PET, PTT, PA6, PA66, PA46, PPS, and LCP). In other cases, PET can also comprise the plastic recycling code "1".

In some embodiments, a polyester-based fabric comprises PET. The polyester-based fabric can comprise PET fibers, PET yarn, and/or PET threads that are formed into a fabric or textile. In some cases, the polyester-based fabric can comprise woven PET fibers, PET yarn, and/or PET threads. In other cases, the polyester-based fabric can comprise a non-woven fabric. The polyester-based fabric can also comprise PET-based fabrics known by the tradenames, DACRON, TERYLENE, LAVSAN, TETORON, DIOLEN, ELANA, and TERGAL. While the polyester-based fabric can comprise any suitable thickness, in some cases, the polyester-based fabric comprises a thickness of less than about 3 mm. In other cases, the polyester-based fabric comprises a thickness of less than about 2 mm. In yet other cases, the polyester-based fabric comprises a thickness of not more than about 1 mm. In some instances, the polyester-based fabric comprises a thickness of about 0.1 mm to about 2.0 mm, and subranges thereof. In other instances, the polyester-based fabric comprises a thickness of about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2.0 mm. In yet other instances, the polyester-based fabric comprises PET fibers comprising an intrinsic viscosity of between about 0.40 dL/g to about 0.70 dL/g.

In some embodiments, the polyester-based fabric is used to produce items for hospital use such as bedding and linens. The polyester-based fabric can also be used to produce items for hospital use including, but not limited to, linens, bedding, bed sheets, fitted sheets, blankets, medical scrubs, hospital gowns, pajamas, robes, towels, washcloths, handkerchiefs, head coverings, curtains, surgical drapes, hospital shoe covers, uniforms, socks, lab coats, and aprons. In other embodiments, the polyester-based fabric can be used to produce any items for hospital use that are customarily made from fabric such as the items described above. In yet other embodiments, the polyester-based fabric can be used to produce items for the hospitality industry including but not limited to, linens, bedding, bed sheets, fitted sheets, blankets, pajamas, robes, towels, washcloths, handkerchiefs, head coverings, curtains, uniforms, socks, tablecloths, napkins, bibs, and aprons.

In some embodiments, the polyester-based fabric is used to produce items that are configured for single-use or for limited-use. In some cases, single-use items can be configured to be used only one time. In other cases, limited-use items can be configured to be used for a limited number of uses (e.g., 1, 2, 3, 4, 5, 6, 7, 8, 9, or 10 uses). For example, hospital linens can be configured as single-use or limited-use items and can be configured to be used for a single patient and/or for limited amount of time (e.g., 1, 2, 3, 4, 5, 6, or 7 days). An advantage of single-use or limited-use items is that the items can be less costly to manufacture because the items do not need to be designed for long-term use. Another advantage of single-use or limited-use items is that the items do not have to be cleaned and/or decontaminated after use so that they can be used again. For example, hospital linens configured as single-use or limited-use items can be discarded and/or recycled after use and do not need to be cleaned and/or decontaminated for reuse thereby reducing the need for laundering services and the risk of cross-contamination of patients, staff, and medical practitioners. In yet other cases, any of the items described above for hospital use and/or hospitality use can comprise polyester-based fabric and can be configured for single-use or limited-use. In some instances, polyester-based fabric can be configured for single-use or limited-use fabric items in any industry where single-use or limited-use fabric items may be beneficial.

Figure 2:
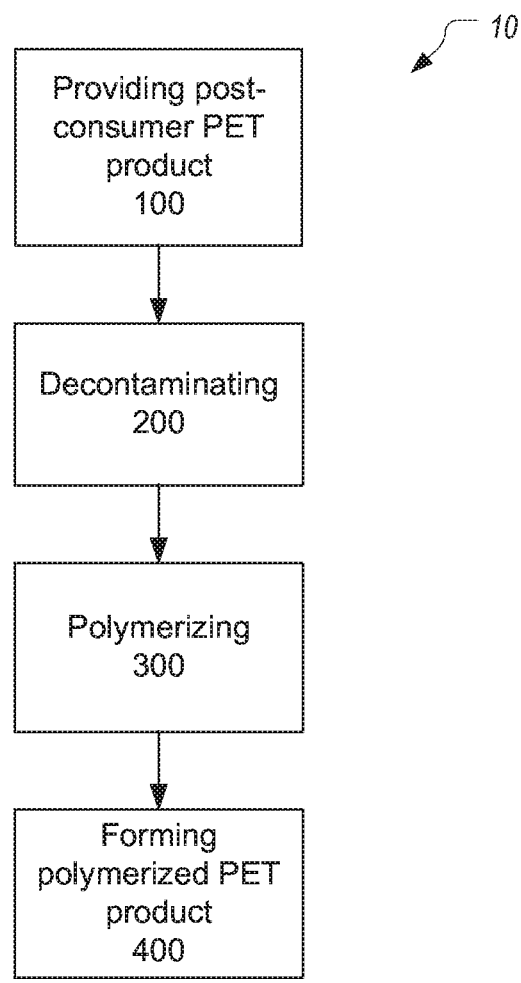
FIG. 2 illustrates a flow diagram of some embodiments of a process for recycling post-consumer polyester-based fabrics.

In general, some embodiments of the described systems and methods relate to recycling post-consumer polyester-based fabric. While the systems and methods can comprise any suitable step and/or component, FIG. 2 shows that, at least in some cases, a method 10 for recycling post-consumer polyester-based fabric can comprise a providing post-consumer PET product step 100, a decontaminating step 200, a polymerizing step 300, and a forming products from the polymerized PET product step 400.

With respect to the providing post-consumer PET product step 100, the step 100 can include any suitable step to provide suitable post-consumer PET product to be recycled. For example, in some embodiments the step 100 can include drying the post-consumer PET product, such as by exposing the post-consumer PET product in a dry air environment at a temperature between 100° C. and 140° C. In this way, the step 100 removes any solvents and/or water molecules from the post-consumer PET product prior to further processing and/or recycling.

In some embodiments, the suitable post-consumer PET product comprises soiled single-use or limited-use polyester-based hospital linens. The soiled single-use or limited-use polyester-based hospital linens can be provided in any suitable manner to the method 10. For example, the soiled hospital linens can be sealed in a plastic bag to prevent cross-contamination and for ease of transport. In some cases, multiple soiled hospital linens can be sealed in a plastic bag. The sealed soiled hospital linens can then be stacked on pallets in groups of about 100 pounds to about 500 pounds and then transported to a recycling facility. An advantage of sealing the soiled hospital linens in this manner is that no hospital staff comes into contact with the soiled hospital linens after they are sealed and the risk of infection and/or cross contamination is reduced. Other types of suitable post-consumer PET product (e.g., soiled towels, blankets, robes, hospital scrubs) can be sealed and transported in the same manner.

In some embodiments, the post-consumer PET product is provided in a form that is substantially unaltered from a pre-consumer form and subjected to the decontaminating step 200 in this substantially unaltered form. For example, soiled single-use or limited-use polyester-based hospital linens can be provided in this substantially unaltered form as bed sheets. These soiled single-use or limited-use polyester-based hospital linens can be decontaminated without shredding, cutting, or rending of the linens. An advantage of providing and decontaminating the soiled single-use or limited-use polyester-based hospital linens in a substantially unaltered form is reduced cost and reduced processing time. Another advantage of providing and decontaminating the soiled single-use or limited-use polyester-based hospital linens in a substantially unaltered form is that the thickness of the bed sheets in the pre-consumer form is already conducive to solid state polymerization in the polymerizing step 300.

In some embodiments, the post-consumer PET product is processed before decontamination. This processing can reduce the size of the post-consumer PET product. For example, soiled single-use or limited-use polyester-based hospital linens can be shredded into smaller pieces. In some cases, the soiled single-use or limited-use polyester-based hospital linens can be shredded into pieces between 1 cm and 10 cm in length. In other cases, the soiled single-use or limited-use polyester-based hospital linens can be shredded into pieces between 2 cm and 5 cm in length. In some instances, the shredded pieces can be further processed to remove any elastic material (e.g., elastic material from fitted bed sheets). The elastic material can be removed by one or more of gravimetric differences, flotation, vibration, or by a rotary system.

In some embodiments, decontaminating step 200 comprises removing any soiling from the post-consumer PET product. Decontaminating 200 also includes removing any contaminants from the post-consumer PET product. For example, soiled single-use or limited-use polyester-based hospital linens can be contaminated with any number of contaminants from use by patients, staff members, and medical practitioners. Contaminants can include, but are not limited to, infectious waste, tissue, colorants, inks, dyes, human waste, biomedical waste, tissue, skin, hair, blood, sweat, tears, urine, feces, bodily fluids, clinical waste, medical waste, food, and dirt. In some cases, decontaminating 200 also comprises sterilizing the post-consumer PET product. Sterilizing can include one or more of removing, inactivating, denaturing, killing, and eliminating a pathogen. Pathogens can include one or more of microbes, bacteria, fungi, virus, parasites, prions, and other infectious particles.

Although decontaminating 200 can comprise any suitable step or component to remove soiling, remove contaminants, and sterilize, at least in some cases, decontaminating 200 can comprise incubating the post-consumer PET product with a solvent in an enclosed vessel. The post-consumer PET product can be stirred as it is incubated in the enclosed vessel. In some cases, the post-consumer PET product can be incubated at between about 20° C. and about 200° C., and any subranges thereof. In other cases, the post-consumer PET product can be incubated at between about 50° C. and about 200° C., and any subranges thereof. In yet other cases, the post-consumer PET product can be incubated at about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., or about 200° C. In some instances, an incubation temperature can be adjusted based on a level of soiling of the post-consumer PET product. In other instances, the incubation temperature can be adjusted based on a type of soiling of the post-consumer PET product.

In some cases, the post-consumer PET product can be incubated at between about 0 kPa and about 200 kPa, and any subranges thereof. In other cases, the post-consumer PET product can be incubated at between about 90 kPa and about 200 kPa, and any subranges thereof. In yet other cases, the post-consumer PET product can be incubated at about 90 kPa, about 100 kPa, about 110 kPa, about 120 kPa, about 130 kPa, about 140 kPa, about 150 kPa, about 160 kPa, about 170 kPa, about 180 kPa, about 190 kPa, or about 200 kPa. In some instances, an incubation pressure can be adjusted based on a level of soiling of the post-consumer PET product. In other instances, the incubation pressure can be adjusted based on a type of soiling of the post-consumer PET product.

In some cases, the post-consumer PET product can be incubated at between about 1 minute and about 180 minutes, and any subranges thereof. In other cases, the post-consumer PET product can be incubated at between about 15 minute and about 100 minutes, and any subranges thereof. In yet other cases, the post-consumer PET product can be incubated about 10 minutes, about 20 minutes, about 30 minutes, about 40 minutes, about 50 minutes, about 60 minutes, about 70 minutes, about 80 minutes, about 90 minutes, or about 100 minutes. In some instances, an incubation time can be adjusted based on a level of soiling of the post-consumer PET product. In other instances, the incubation time can be adjusted based on a type of soiling of the post-consumer PET product.

In some embodiments, the solvent comprises any suitable liquid to effectively remove soiling, remove contaminants, and sterilize the post-consumer PET product. For example, the solvent can comprise one or more of an aqueous liquid, an organic solvent, and an alcohol. The solvent can also comprise additives such as surfactants, detergents, and ionic additives. The solvent can also be applied in sequentially in batches and can comprise different liquids for each batch. In some cases, the solvent comprises one or more of ethanol, benzene, ethylene glycol, propylene glycol, acetone, water, and other related liquids. In other embodiments, the solvent is filtered during incubation. The solvent can be filtered with one or more of a membrane type filter, a screen filter, an activated carbon filter, and a belt filter. In some instances, the post-consumer PET product can be incubated in the solvent in a batch mode configuration. In other instances, the post-consumer PET product can be incubated in the solvent in a continuous mode configuration with the post-consumer PET product moved from one vessel to another by positive-displacement pumps. In some instances, a composition of the solvent can be adjusted based on a level of soiling of the post-consumer PET product. In other instances, the composition of the solvent can be adjusted based on a type of soiling of the post-consumer PET product. In yet other instances, the filtering of the solvent can be adjusted based the on level of soiling of the post-consumer PET product and/or the type of soiling of the post-consumer PET product. After incubating, the solvent can be removed by one or more of centrifuge, press filter, and rotary dryer.

In some embodiments, polymerizing step 300 comprises polymerizing the decontaminated post-consumer PET product via solid state polymerization to generate a polymerized PET product. In some cases, solid state polymerization can be configured to enhance mechanical and rheological properties of the polymerized PET product. In other cases, solid state polymerization can be configured to increase polymer chain lengths in the decontaminated post-consumer PET product to generate the polymerized PET product. In yet other cases, solid state polymerization can be configured to increase a molecular weight of polymers in the decontaminated post-consumer PET product to generate the polymerized PET product.

In some cases, solid state polymerization can be carried out by heating the decontaminated post-consumer PET product at a temperature above the glass transition temperature (Tg) of PET and below the melting temperature (Tm) of PET. In some instances, the heating can be carried out in the absence of water and oxygen to reduce undesirable side reactions. Often the heating can be carried out under vacuum or under an inert gas (e.g., nitrogen, helium, and argon) to remove water and oxygen to reduce undesirable side reaction. In other instances, because PET can be hygroscopic, the decontaminated post-consumer PET product can be heated to drive off moisture. In yet other instances, the decontaminated post-consumer PET product can be heated to drive off moisture to a level below about 50 ppm. The heating can be carried out under vacuum or under an inert gas to reduce undesirable side reactions and/or to remove undesirable by-products such as ethylene glycol and acetaldehyde. Solid state polymerization can be affected by a number of parameters such as temperature, pressure, and diffusion of by-products from an interior of the PET product to a surface of the PET product. Therefore, in some instances, a size (e.g., a thickness) of the PET product subjected to solid state polymerization can affect one or more of the rate, efficiency and quality of the solid state polymerization. In some cases, a PET product with a thinner diameter and/or a reduced thickness can permit greater diffusion of by-products from the interior of the PET product to the surface of the PET product and can thereby improve solid state polymerization.

In some embodiments, solid state polymerization is carried out by continuously feeding the decontaminated PET product into a tool that heats the product to between about 190° C. and about 230° C. under a heated nitrogen stream. In some cases, the temperature can be about 190° C., 195° C., 200° C., 205° C., 210° C., 215° C., 220° C., 225° C., and 230° C. A carrying system for the decontaminated post-consumer PET product can allow for continuous heating of the product and continuous heated nitrogen flow for between about 8 hours and about 48 hours. In other cases, the decontaminated post-consumer PET product can be continuously heated with continuous heated nitrogen flow for about 8 hours, about 10 hours, about 15 hours, about 20 hours, about 25 hours, about 30 hours, about 35 hours, about 40 hours, about 45 hours, and about 48 hours.

In some cases, the decontaminated PET product comprises single-use or limited-use polyester-based fabric. In other cases, the decontaminated PET product comprises post-consumer PET product is provided in a form that is substantially unaltered from a pre-consumer form and subjected to the decontaminating step 200 in this substantially unaltered form. For example, decontaminated hospital linens substantially unaltered from a pre-consumer form can be fed directly into the tool for heating under the heated nitrogen stream. An advantage is that the relatively reduced thickness of the decontaminated hospital linens substantially unaltered from a pre-consumer form (e.g., no more than 1 mm) can permit greater diffusion of by-products from the interior of the PET product to the surface of the PET product and can thereby improve solid state polymerization.

In some embodiments, polymerizing 300 comprises melting and forming pellets from the decontaminated post-consumer PET product followed by solid state polymerization of the formed pellets. While the pellets can comprise any suitable shape, at least in some cases, the pellets can comprise a diameter of between about 0.1 mm and about 5 mm. In other cases, the pellets can comprise a diameter of between about 0.5 mm and about 1.5 mm. In yet other cases, the pellets can comprise a diameter of no more than about 1 mm. After the pellets are formed, they can be subjected to solid state polymerization as described above by feeding them into a tool that heats the product to between about 190° C. and about 230° C. under a heated nitrogen stream for between about 8 to about 48 hours. The polymerized pellets can then be packaged and sold as a commodity or can be formed into a polymerized PET product.

In some embodiments, forming polymerized PET product step 400 comprises forming one or more products from the polymerized PET product. In some cases, the polymerized PET product is received hot from the solid state polymerization and further heated to melt it. This molten polymerized PET product can then formed into items. In some cases, the molten polymerized PET product can be shaped into pellets. The pellets can be allowed to cool and can then be packaged and sold as a commodity or used to make other PET products. In other cases, the molten polymerized PET product can be extruded into a synthetic fiber. This synthetic fiber can then be sold as a commodity or can be used to generate polyester-based fabric. In other cases, the polyester-based fabric can be used to generate fabric items such as single-use or limited-use hospital linens. In other embodiments, the molten polymerized PET product can be converted into PET plastic sheets or other types of extruded materials (e.g. sheeting, strapping, packaging, etc.).

The systems and methods for recycling post-consumer polyester-based fabric can have several useful features. For example, the disclosed methods and systems do not require that the polymers of the recycled polyester-based fabric be broken down into individual monomers and/or oligomers as part of the recycling process. In contrast, the polymers of the recycled polyester-based fabric are polymerized through solid state polymerization. Also, the disclosed methods and systems can recycle the polyester-based fabric while the fabric remains in a substantially unaltered form from the pre-consumer form. By recycling the fabric in a substantially unaltered form from the pre-consumer form, time, energy, and resources are saved. An example is recycling bedding (e.g., a bed sheet) comprising polyester-based fabric by decontaminating, polymerizing, and generating a recycled bed sheet.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for recycling a polyethylene terephthalate (PET) consumer product, said PET consumer product being new and comprising a geometric shape prior to consumer use, and said PET consumer product being used and comprising the geometric shape and a soiling substance comprising one or more of infectious waste, tissue, and colorants subsequent to consumer use, the method comprising:
- selecting a used PET consumer product comprising the geometric shape and the soiling substance;
- decontaminating the used PET consumer product to remove the soiling substance to provide a decontaminated used PET consumer product comprising the geometric shape; and
- polymerizing the decontaminated used PET consumer product via solid state polymerization to generate a decontaminated and polymerized used PET consumer product, wherein the decontaminated and polymerized used PET consumer product comprises the geometric shape.

2. The method of claim 1, wherein the used PET consumer product is a woven or non-woven fabric material.

3. The method of claim 2, wherein a thickness of the woven or non-woven fabric is less than or equal to 1 mm.

4. The method of claim 1, wherein the used PET consumer product comprises soiled hospital bedding.

5. The method of claim 1, wherein the step of decontaminating further comprises incubating the used PET product in a stirred vessel with a solvent.

6. The method of claim 1, wherein the step of decontaminating comprises incubating at between about 50° C. and about 200° C.

7. The method of claim 1, wherein the step of decontaminating comprises incubating at between about 90 kPa and about 200 kPa.

8. The method of claim 1, wherein the step of decontaminating comprises incubating for between about 15 minutes and about 100 minutes.

9. The method of claim 5, wherein the solvent is selected from the group consisting of ethanol, benzene, ethylene glycol, propylene glycol, water, and acetone.

10. The method of claim 5, further comprising a step for continuously filtering the solvent.

11. The method of claim 10, wherein the step of continuously filtering the solvent comprises one or more of filtering with a membrane-type filter, filtering with a screen filter, filtering with active carbon, and filtering with a belt-filter.

12. The method of claim 5, further comprising steps for:
- removing the solvent after incubation; and
- drying the decontaminated PET product.

13. The method of claim 1, wherein the step of polymerizing comprises a step for heating the decontaminated used PET product to a temperature of between about 190° C. and about 230° C.

14. The method of claim 13, wherein the step for heating is carried out under a vacuum.

15. The method of claim 13, wherein the step for heating is carried out in an inert gas atmosphere consisting of one or more of nitrogen, helium, and argon.

16. The method of claim 1, wherein the step of polymerizing is carried out for between about 8 hours and about 48 hours.

17. The method of claim 1, further comprising a step for converting the polymerized PET product into pellets having a diameter of approximately 1 mm.

18. The method of claim 1, further comprising a step for extruding the polymerized PET product into a synthetic fiber.

19. The method of claim 1, further comprising a step for extruding the polymerized PET product into a sheet material.

20. The method of claim 1, further comprising a step for drying the used PET consumer product following the step of decontaminating the used PET consumer product and prior to the step of polymerizing the decontaminated used PET consumer product.

* * * * *